(12) United States Patent
Gao et al.

(10) Patent No.: US 11,244,288 B2
(45) Date of Patent: Feb. 8, 2022

(54) TASK REMINDER GENERATOR

(71) Applicant: INTERNATIONAL BUSINESS MACHINES CORPORATION, Armonk, NY (US)

(72) Inventors: Jun Hua Gao, Beijing (CN); Cheng Fang Wang, Beijing (CN); Guang Yu Ye, Beijing (CN); Jing Jing Zhang, Zhangjiakou (CN); Xue Yong Zhang, Beijing (CN); Xue Liang Zhao, Beijing (CN); Xi Bo Zhu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 389 days.

(21) Appl. No.: 15/173,414

(22) Filed: Jun. 3, 2016

(65) Prior Publication Data

US 2017/0352008 A1 Dec. 7, 2017

(51) Int. Cl.
*G06Q 10/10* (2012.01)

(52) U.S. Cl.
CPC .................. *G06Q 10/1097* (2013.01)

(58) Field of Classification Search
CPC .................................................. G06Q 10/1097
See application file for complete search history.

(56) References Cited

U.S. PATENT DOCUMENTS

| | | | |
|---|---|---|---|
| 6,272,532 B1 | 8/2001 | Feinleib | |
| 8,108,206 B2 | 1/2012 | Hufnagel et al. | |
| 8,375,320 B2 | 2/2013 | Kotler et al. | |
| 8,527,263 B2 | 9/2013 | Bradley et al. | |
| 9,047,117 B2 | 6/2015 | Horvitz et al. | |
| 9,111,233 B2 | 8/2015 | Elumalai et al. | |
| 10,007,886 B1 * | 6/2018 | Khvostichenko | G06Q 10/06311 |
| 2007/0150513 A1 * | 6/2007 | Vanden Heuvel | G06F 3/04842 |
| 2007/0288279 A1 | 12/2007 | Haugen et al. | |
| 2011/0314404 A1 * | 12/2011 | Kotler | G06Q 10/109 715/772 |
| 2014/0033071 A1 * | 1/2014 | Gruber | G06F 3/0488 715/752 |

(Continued)

FOREIGN PATENT DOCUMENTS

| | | | |
|---|---|---|---|
| CA | 2638213 A1 * | 1/2009 | ........... G06Q 10/109 |
| WO | 2011163094 A1 | 12/2011 | |

OTHER PUBLICATIONS

Bouchard, How to turn an email into a reminder on Mac, Mar. 29, 2016 (Year: 2016).*

(Continued)

*Primary Examiner* — Mohamed N El-Bathy
(74) *Attorney, Agent, or Firm* — Tutunjian & Bitetto, P.C.; Scott Dobson

(57) ABSTRACT

Systems and methods are provided for generating task reminders. The method includes identifying, using a processor, a task description by parsing digital text from a message in an application. The method further includes obtaining context information from the parsed digital text indicating an association between the task description and the application. The method additionally includes generating, using the processor, a task reminder based on the obtained context information, the task reminder including digital text indicating the association between the task description and the application.

17 Claims, 7 Drawing Sheets

(56) References Cited

U.S. PATENT DOCUMENTS

| | | |
|---|---|---|
| 2014/0189017 A1 | 7/2014 | Prakash et al. |
| 2015/0143258 A1 | 5/2015 | Carolan et al. |
| 2015/0169696 A1 | 6/2015 | Krishnappa et al. |
| 2015/0278199 A1* | 10/2015 | Hazen ............... G06F 17/28 704/9 |
| 2016/0005002 A1* | 1/2016 | Azose ............... G06Q 10/02 705/7.18 |
| 2016/0155096 A1* | 6/2016 | Choi ............... G06Q 10/109 705/7.21 |
| 2017/0132019 A1* | 5/2017 | Karashchuk ............ H04W 4/12 |

OTHER PUBLICATIONS

Type App, Snoozing Emails for Later, 2015 (Year: 2015).*
Anonymous, "Your Lightweight Task Manager," Ticktick.com, retreived Sep. 2015. (pp. 1-11). Available at: https://www.ticktick.com/.

* cited by examiner

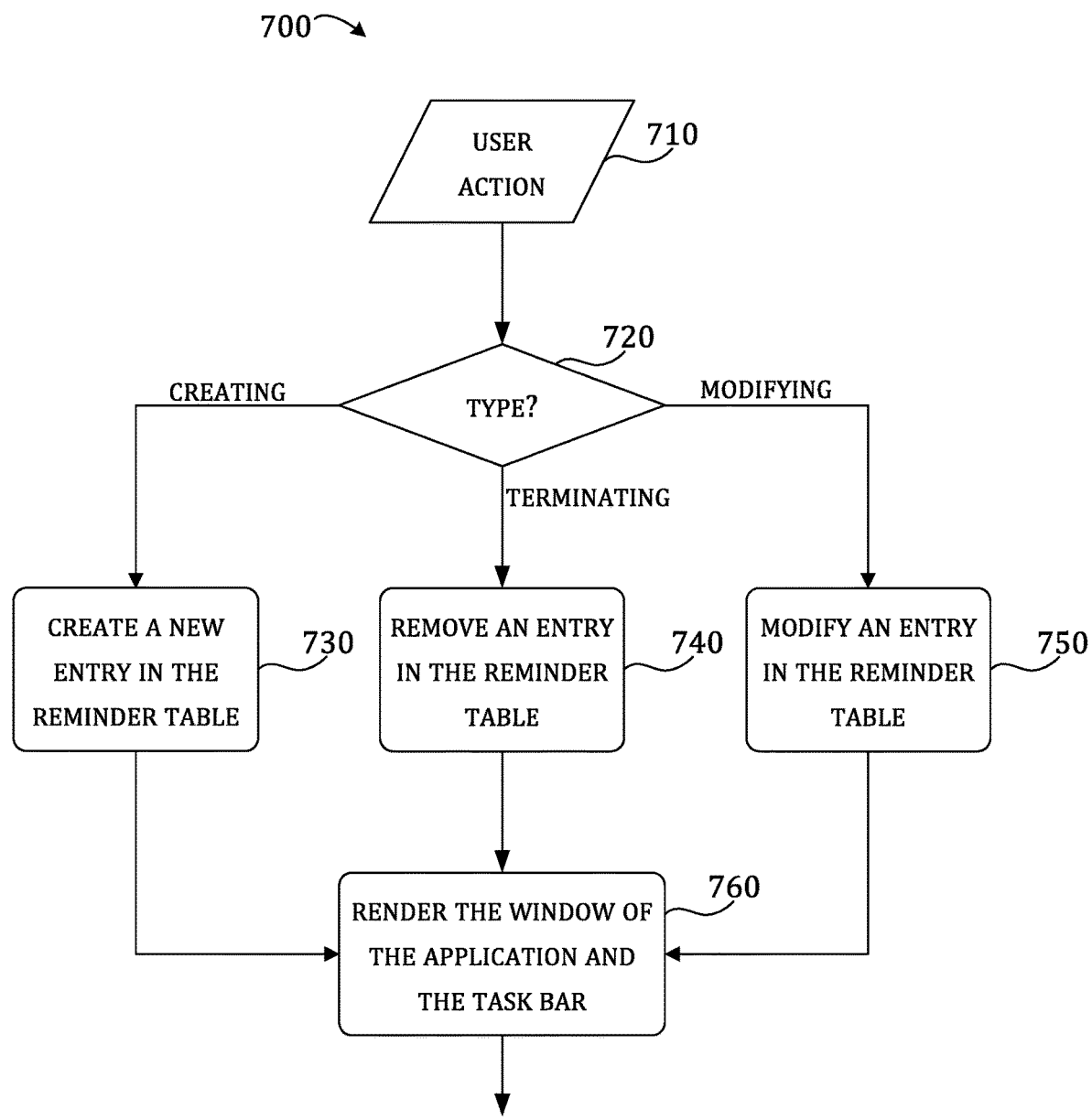

TASK REMINDER GENERATOR

BACKGROUND

Technical Field

The present invention generally relates to task reminder generation, and more particularly to generating task reminders based on context information.

Description of the Related Art

With developments of the computer and communication technologies, a number of advancements have been made to aid people in scheduling their tasks in daily life. In order to aid people who are attempting to deal with numerous tasks at work and/or at home, electronic tasks and calendaring programs have been developed for facilitating scheduling.

SUMMARY

Although some approaches have been proposed to generate a task reminder in a calendar, these approaches are heavily dependent on manual works and cannot provide enough details of the task. When the task reminder is prompted to a user, the user may be confused and cannot recall the cause and effect associated with the task reminder.

In an embodiment, a computer-implemented method is proposed. According to the method, a task description is identified from a message in an application. Then, context information indicating an association between the task description and the application is obtained. Next, a task reminder is generated based on the obtained context information.

In another embodiment, a computing system is proposed. The computing system comprises a computer processor coupled to a computer-readable memory unit, the memory unit comprising instructions that, when executed by the computer processor, implements a method. In the method, a task description is identified from a message in an application. Then, context information indicating an association between the task description and the application is obtained. Next, a task reminder is generated based on the obtained context information.

In yet another embodiment, a computer program product is proposed. The computer program product is tangibly stored on a non-transient machine readable medium and comprising executable instructions which, when executed on an electronic device, cause the electronic device to identify a task description from a message in an application; obtain context information indicating an association between the task description and the application; and generate a task reminder based on the obtained context information.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein:

FIG. 7 schematically illustrates a flowchart of a method for processing a user action according to an embodiment of the present disclosure.

Throughout the drawings, same or similar reference numerals represent the same or similar elements.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones describe below.

As used herein, the term "includes" and its variants are to be read as opened terms that mean "includes, but is not limited to." The term "based on" is to be read as "based at least in part on." The term "one embodiment" and "an embodiment" are to be read as "at least one embodiment." The term "another embodiment" is to be read as "at least one other embodiment."Other definitions, explicit and implicit, may be included below.

Figure 1:
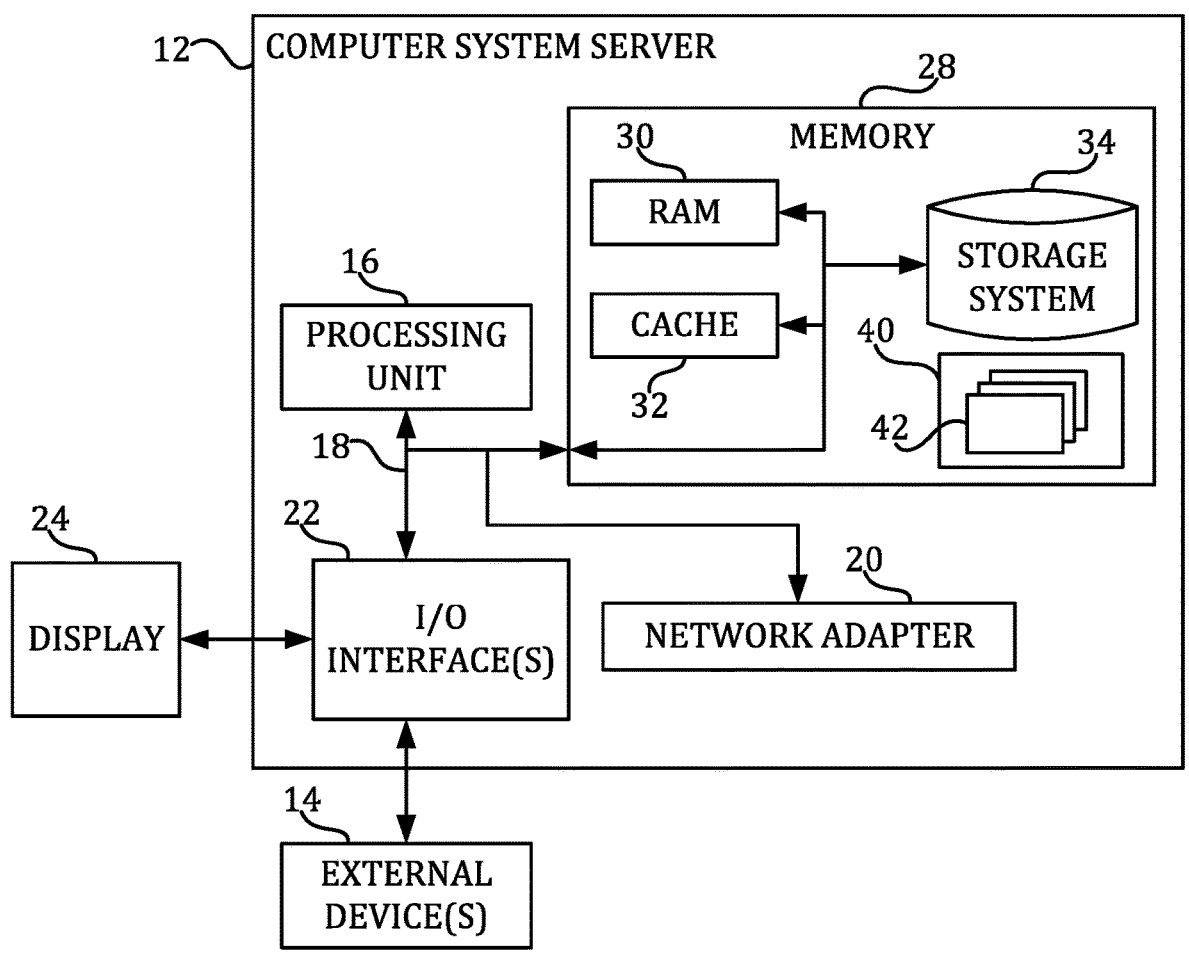
FIG. 1 schematically illustrates an example computer system/server which is applicable to implement embodiments of the present disclosure.

Reference is first made to FIG. 1, in which an example electronic device or computer system/server 12, which is applicable to implement embodiments of the present disclosure, is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Some approaches have been proposed for generating a task reminder. In some calendar tools, the user is allowed to add a task reminder into the calendar, and the user may specify a time point (e.g., 09:00 AM, Jan. 1, 2016) for popping up the task reminder. The user may further add into the task reminder a brief (such as, e.g., "book a meeting room . . . ") as well as other information. Then, for example, the task reminder, to remind the user to book a meeting room, may be popped up at 09:00 AM, Jan. 1, 2016.

Although these calendar tools may be helpful, they are heavily dependent on manual inputs from the user and sometimes the user cannot determine the exact time point for popping up the task reminder.

In one example, Amanda receives an email from Tony while she is working on some urgent development work. In this email, Tony asks Amanda to book a meeting room for next Tuesday's meeting and send invitations to a group of colleagues. If Amanda is busy and does not have time at that moment to perform the requested tasks, she may tell Tony that she will book the meeting room later after she finishes her work at hand. At this point, even if Amanda wants to add a reminder to her calendar, she cannot determine the time point for popping up the task reminder because she does not know when she can finish her work. Accordingly, Amanda has to manually write down a reminder into her to-do list.

Figure 2:
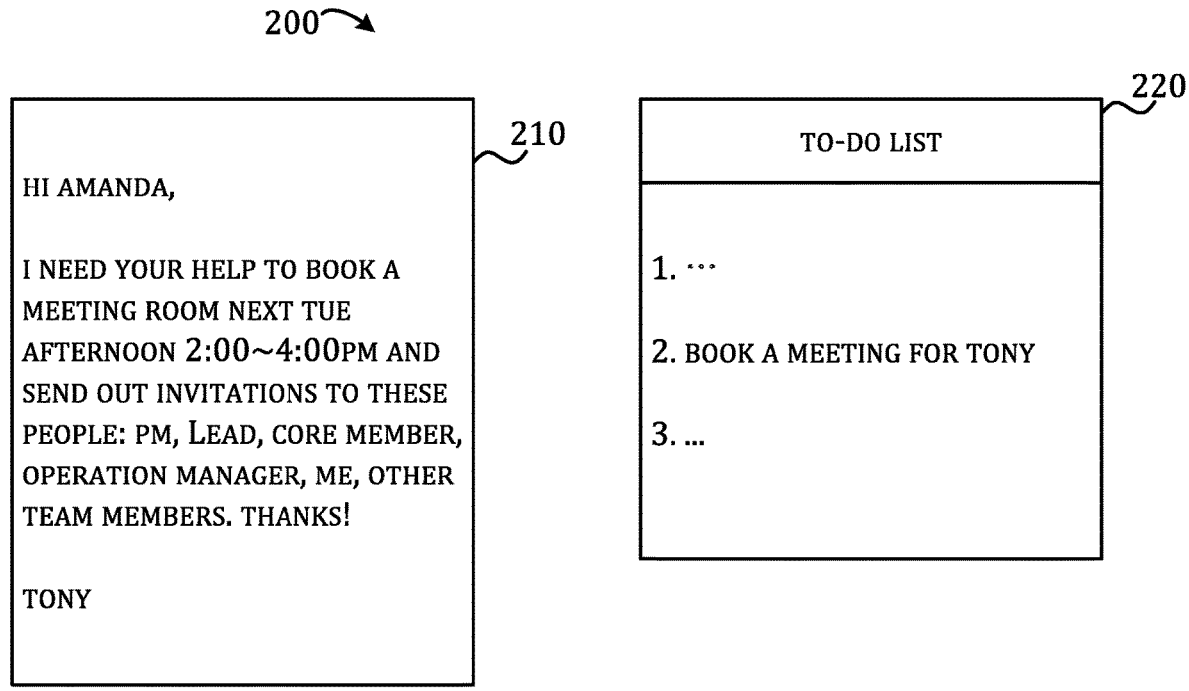
FIG. 2 schematically illustrates a block diagram for generating a task reminder according to an embodiment of the present disclosure.

FIG. 2 schematically illustrates a block diagram 200 for generating a task reminder according to an embodiment of the present disclosure. As illustrated in FIG. 2, Amanda receives an email 210 from Tony and is asked to book a meeting room while she is working. As the calendar tool is not helpful in this situation, Amanda has to open the calendar and add a reminder into her to-do list 220 manually. When she finishes her work at hand and checks the to-do list, it is possible that she will not be able to recall the exact details of the task and must turn back to the email originally received from Tony for further information.

Further, some tools may be used for extracting information from emails. These tools can extract textual information, such as, e.g., the time, the position, the task and the like. However, these tools tend to lose detailed and/or implied information such as, e.g., the grammatical mood, the background information, the cause and effect, and so on. In view of the above, it is hard for the user to recall the cause and effect associated with the task reminder generated according to the above approaches, and it is desired to develop a technical solution for generating a task reminder in an easy and effective manner.

According to an embodiment of the present disclosure, there is proposed a computer-implemented method. In the method, the original message that triggers the user to generate a task reminder is important. Referring to FIG. 2, the email 210 received from Tony is the trigger of the task. As the email 210 records all the information related to the task, when the email 210 is displayed to Amanda, it is easy for her to recall all the details of the scenario when she is asked to book a meeting room.

According to an embodiment of the method, a task description is identified from a message in an application. Then, context information indicating an association between the task description and the application is obtained. Next, a task reminder is generated based on the obtained context information.

Figure 3:
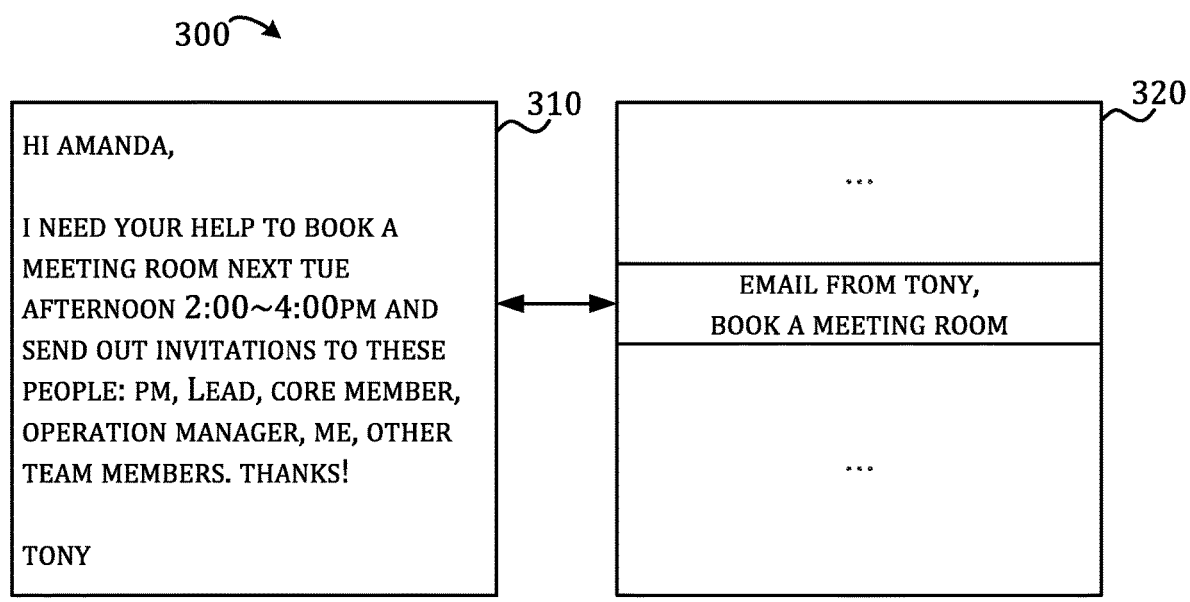
FIG. 3 schematically illustrates a block diagram for generating a task reminder according to an embodiment of the present disclosure.

FIG. 3 schematically illustrates a block diagram 300 for generating a task reminder according to an embodiment of the present disclosure. In FIG. 3, reference number 310 represents the email that Amanda receives from Tony via an email client. In this email 310, Tony asks Amanda to book a meeting room for 02:00-04:00 PM on next Tuesday and send invitations to a group of colleagues. In the email 310, "to book a meeting room next Tue afternoon 2:00~4:00 pm and send out invitations to these people: pm, Lead, core member, operation manager, me, other team members" may be considered as the task description, and the task description is carried in the email 310 received in the email client. In this example, the context information 320 may be represented as an association of "email from Tony" and "book a meeting room." Specifically, the context information may be represented by the two-tuples of (email from Tony, book a meeting room). With the context information, a task reminder may be generated and, when the task reminder is displayed to Amanda, she can easily find the original email and recall all the information about the task.

Figure 4:
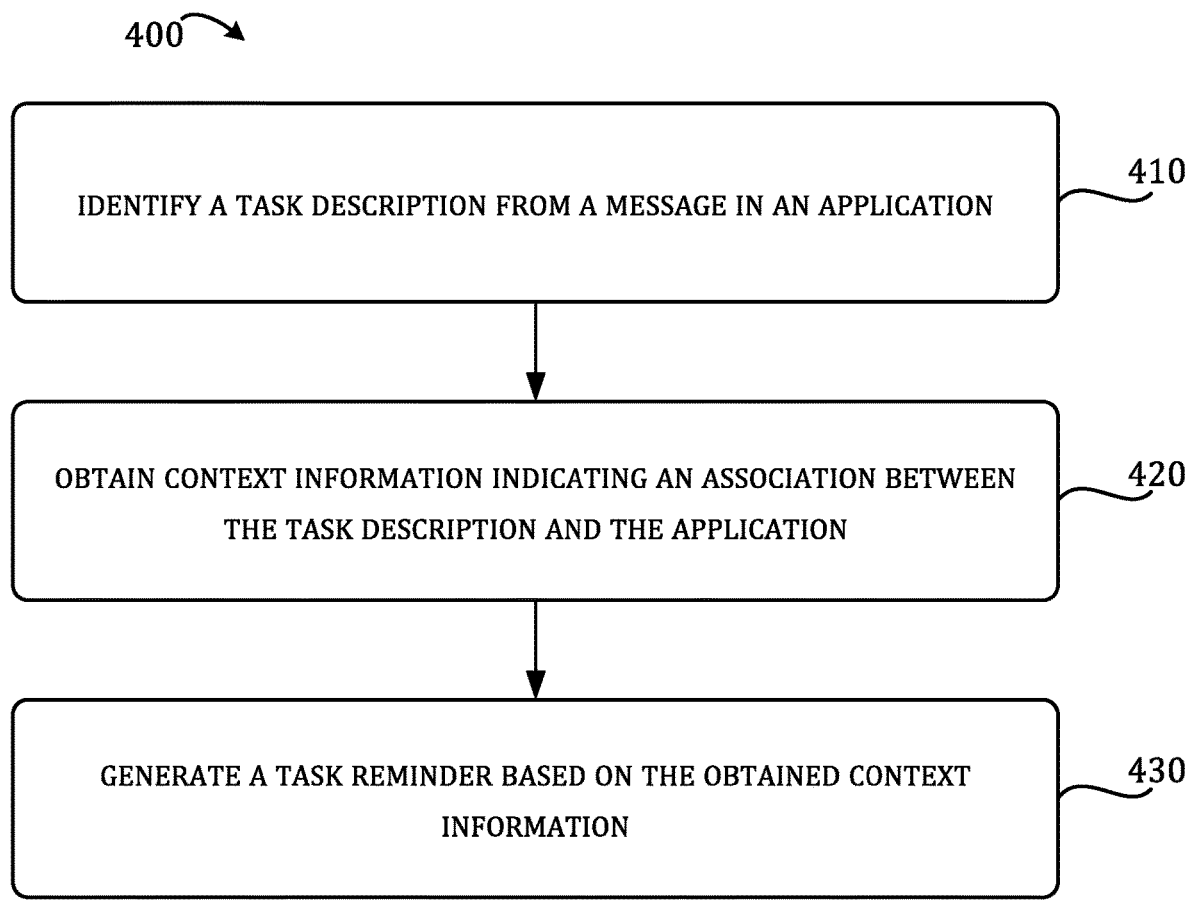
FIG. 4 schematically illustrates a flowchart of a method for generating a task reminder according to an embodiment of the present disclosure.

FIG. 4 schematically illustrates a flowchart of a method 400 for generating a task reminder according to an embodiment of the present disclosure. In Step 410, a task description is identified from a message in an application program. In the context of the present disclosure, the task description refers to the actions that should be implemented in the task. The task description may be a sentence originally cited in the message; alternatively, it may be a brief summarized portion of the message. For example, the task description may be "to book a meeting room next Tue afternoon 2:00~4:00 pm and send out invitations to these people: pm, Lead, core member, operation manager, me, other team members." For another example, the task description may be represented as "book a meeting room and send out invitations." In this step, the present disclosure does not limit the source of the message. Instead, the message may be a message received by the application or a message that is loaded into the application but obtained by another application. For example, the message may be an email received in an email client, alternatively, the message may be an email loaded into the email client from an external storage.

In Step 420, the context information indicating an association between the task description and the application is obtained. In an embodiment, the context information is built according to the task description and the application. The context information may be stored in an appropriate data structure. For example, the two-tuples including the task description and the name of the application may be adopted, where the context information in the example of FIG. 3 may be represented by, e.g., (email, book a meeting room). Further, the context information may include other details such as the sender of the email, the timestamp of the email, and other detailed information about the task description. At this point, based on the specific environment of the implementation, the context information may be saved in tuples with multiple dimensions, a table, a list, or the like.

In Step 430, a task reminder is generated based on the obtained context information. With the context information included in the task reminder, the user may clearly recall the scenario when he/she was asked to book the meeting room.

With the method of the present disclosure, the context information associates the task description and the application via which the task description was received, and then the task reminder is generated based on the context information. Confronted with the task reminder showing the association between the task description and the application, the user may directly read the content of the task description and find out the original trigger of the task.

Although the above paragraphs describe the method of the present disclosure by taking the email client as an example application, the method may also be implemented in other applications. In an embodiment, the message may be an email in the email client. In an embodiment, the message may be an instant message in an application such as IBM® Sametime® or another tool. In an embodiment, the message may be a real time communication such as a voice/video call via a telephone. In an embodiment, the message may be a real time communication such as, e.g., a voice/video call via a chatting tool.

The embodiments of the present disclosure may be implemented in various types of computing devices. For example, any of the embodiments of the present disclosure may be implemented on a desktop, a laptop, a notebook, a server, a tablet, a smart phone and the like. Further, any of the embodiments of the present disclosure may be implemented on various operation systems such as, e.g., Windows®, Linux®, Mac OS®, Android®, and other operation systems, as long as these operation systems support the method of the present disclosure to read/write the required data from/to the applications installed on the operation systems.

In an embodiment of the present disclosure, in response to a user setting a flag in the message, the task description may be identified based on a position of the flag in the message. The embodiment will be described with reference to FIG. 5, which schematically illustrates an example of a task reminder 500 according to an embodiment of the present disclosure.

Figure 5:
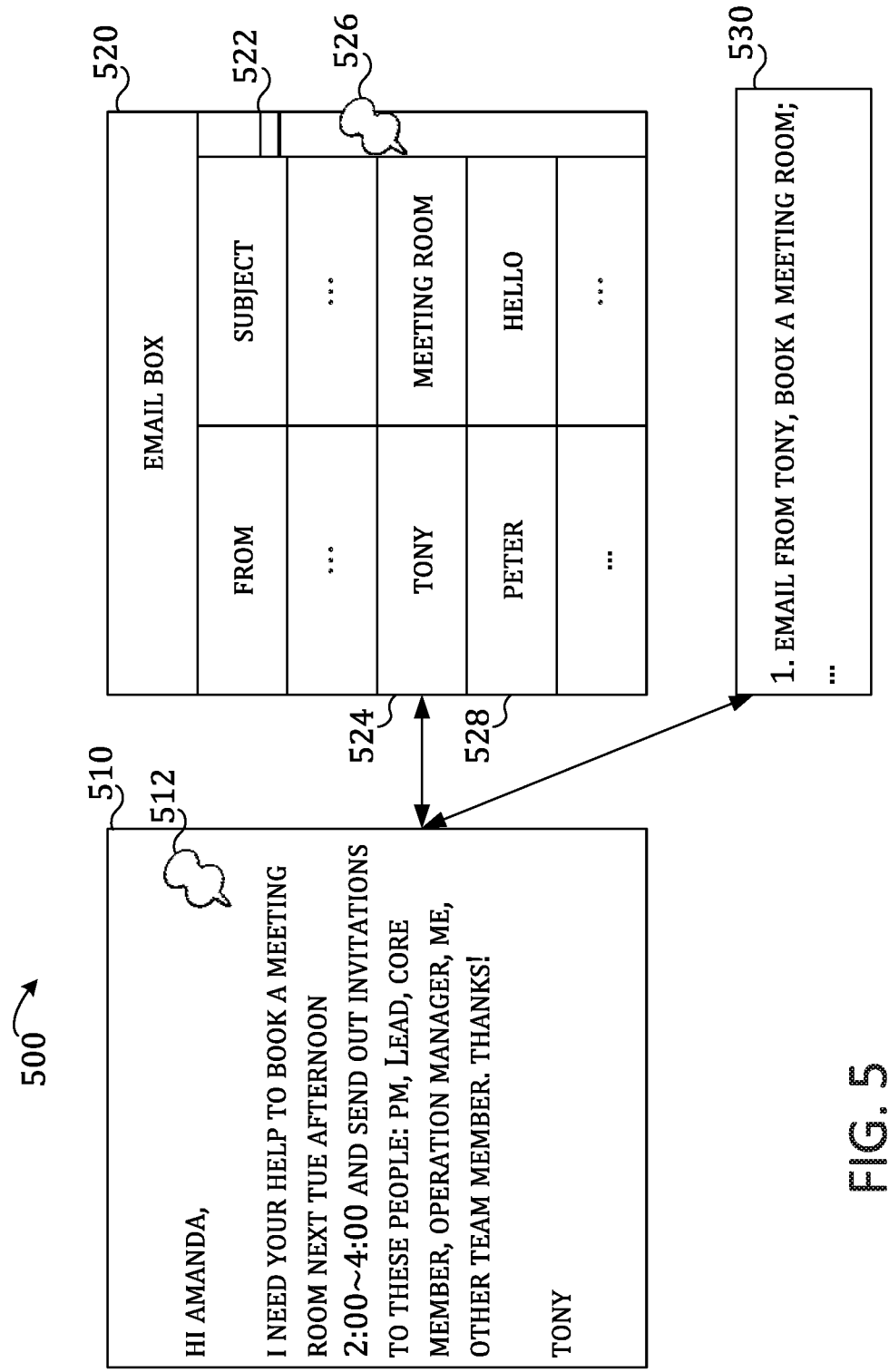
FIG. 5 schematically illustrates an example of a task reminder according to an embodiment of the present disclosure.

As illustrated in FIG. 5, Amanda receives an email 510 from Tony via the email client and then she understands that Tony asks her to book a meeting room. At this point, Amanda may set a flag 512 in the email 510 to highlight the task description. Although a pin is illustrated in FIG. 5 as an icon of the flag 512, other shapes may be adopted in the embodiments of the present disclosure. For example, Amanda may highlight the sentence "to book a meeting room next Tue afternoon 2:00~4:00 and send out invitations to these people: pm, Lead, core member, operation manager, me, other team member" in bold, in color, or with underline using the flag in the email 510. In this embodiment, the task description may be identified based on a position of the flag in the message.

In embodiments of the present disclosure, the user may set the flag 512 in a plurality of manners. In an embodiment, a popup menu may be displayed in response to the user pressing the right button of the mouse, and then an option for setting a flag may be selected from the popup menu. In an embodiment, in response to a predefined shortcut key being pressed, the flag is set at the current position of the cursor or to an interested portion that is highlighted from the message by the user.

In an embodiment of the present disclosure, the task description is identified based on a syntactic analysis of the message. Usually, the messages that result in tasks have some common features in the sentence structure. For example, keywords such as, e.g., "book," "send," "meeting," "fax," and the like may be used in identifying the task description. Further, other methods of the syntactic analysis may be applied to identify the task description.

In an embodiment of the present disclosure, the task reminder may be displayed in the application, additionally and/or alternatively, the task reminder may be displayed in a dedicated task bar. Referring to FIG. 5, the email box 520 shows the "inbox" window in the email client, where the reference number 522 is a scrollbar in the "inbox" window. Entries in the email box 520 show the received emails, including the email 524 relating to the task reminder and the ordinary email 528. As shown, a flag 512 may be added to the email 524, indicating the email 524 is a trigger of the task "book a meeting room."

Additionally and/or alternatively, a dedicated task bar 530 may be built for displaying the task reminder. For example, an entry may be added into the task bar 530 to remind Amanda that she should book a meeting room and send invitations to her colleagues. In an embodiment, the user may define the position and shape of the task bar 530. For example, the task bar 530 may be disposed at the bottom of the desktop of the operation system. Alternatively, the task bar 530 may be rendered as a floating window.

With the task reminder displayed in the application and/or the task bar, the user can easily know the to-be-finished task in the to-do list. Further, as the task reminder may lead the user to the original message associated with the to-be-finished task, he/she may clearly recall each and every detail of the task and further carry out the task at an appropriate time.

In order to reproduce the scenario in which the user receives the message that triggers the task, it is helpful to display the original message in the application via which the original message is received. In an embodiment of the present disclosure, the context information may include at least an address storing the task description from the message in the application. In an embodiment of the present disclosure, the context information may include at least a snapshot of the task description from the message in the application.

The task description may be associated with the application in a plurality of ways. For example, once the message is received in the application, the message is stored at a certain address in the storage. The address may be obtained and served as the context information and it may be added into the task reminder. For example, a snapshot of the task description may be taken for recording the association between the task description and the application. Specifically, the screen displaying the task description in the application may be printed and used as the snapshot. Additionally and/or alternatively, the scenario in which the message is received may be recorded in another format such as word expressions.

In an embodiment of the present disclosure, in response to the task reminder being triggered, a scenario in which the message is received may be reproduced based on the context information. After the task description is identified in the message, the task reminder may be generated. Then the task reminder may be displayed in the application and/or the dedicated task bar. Continuing the example of FIG. 5, Amanda finishes her development work, and then she checks the email client and/or the task bar. The task reminder may be highlighted in bold or by a bright color to attract the attention. Amanda may notice the task reminder and click on the icon of it, and then information about the task may be popped up to show that there is a to-be-finished task in the to-do list.

In an embodiment of the present disclosure, where the reproducing the scenario may comprise rendering the task description by displaying the message in the application based on the address. Once the address of the task description in the message is identified, this address may be used as a clue leading to the display of the task description.

Referring to FIG. 5, the email that includes the task description may be labeled with the flag 526 which reminds the user that there is task in his/her to-do list and he/she should process the task at an appropriate time. At this point, with the flag 526 in the email client 520, the user may easily notice the task. When the user clicks the flag 526, the task description in the message at the address may be displayed in the email client. Further, an indication of the message may also be displayed in the task bar 530. When the user clicks the indication, a window for displaying the task description in the message may be created based on the address. For example, the original email including the information about booking the meeting may be opened in the email client.

Although the above paragraphs show the examples of transmitting the message via email, other applications may be used for transmitting the message. For example, the message may be transmitted via an instant messaging tool such as Sametime® and the like. The a task description from a message transmitted via Sametime® is identified, then the context information indicating an association between the task description and Sametime® is obtained, next a task reminder is generated based on the context information. Similar as the example as illustrated in FIG. 5, the task reminder may be displayed in the windows of both of Sametime® and the task bar.

In an embodiment of the present disclosure, where the reproducing the scenario may comprise rendering the task description by displaying the snapshot of task description. Once the snapshot of the task description in the message is identified, this snapshot may be directly displayed to the user. Referring to FIG. 5, once the user clicks any of the flag 526 and the entry in the task bar 530, the snapshot of the task description may be displayed to the user. In this example, the snapshot briefly illustrates the scenario when the user receives the message for booking the meeting room. Although the user cannot perform further interactions with the snapshot, the snapshot may help the user to recall the scenario and to make further processing.

Figure 6A:
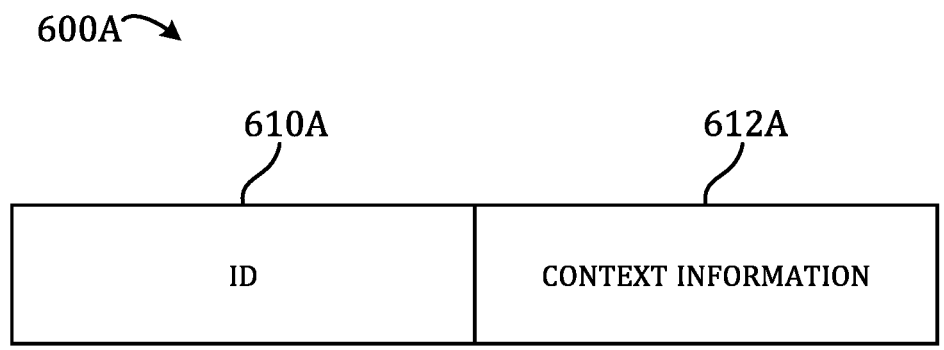
FIGS. 6A and 6B schematically illustrate example data structures of task reminders according to embodiments of the present disclosure, respectively.
Figure 6B:
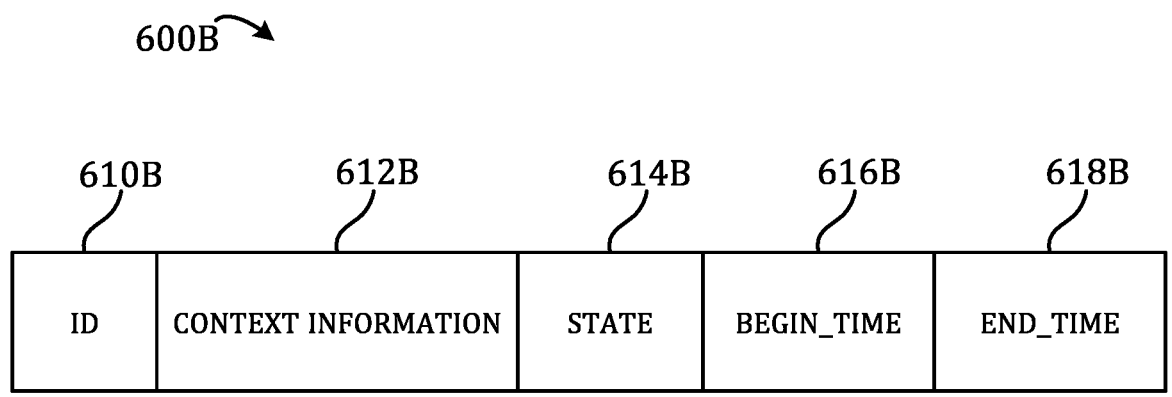

In an embodiment of the present disclosure, the task reminder may further comprise other auxiliary information. FIGS. 6A and 6B schematically illustrate example data structures 600A, 600B, of task reminders according to embodiments of the present disclosure, respectively. As illustrated in FIG. 6A, the data structure 600A may include an ID field 610A for uniquely identifying the associated task reminder, a context information field 612A for storing the association between the task description and the application.

In an embodiment of the present disclosure, a state of the task reminder may be set to "unfinished" when the task reminder is generated. According to an embodiment of the present disclosure, in response to a task indicated by the task reminder having been completed, a state of the task reminder may be set to "finished."

FIG. 6B schematically illustrates an example data structure including additional fields according to embodiments of the present disclosure. In FIG. 6B, the data structure 600B may include an ID field 610B and a context information field 612B and other aspects associated with the task reminder. Compared with the data structure 600A, the data structure 600B may also include a state field 614B for indicating the state (unfinished/finished) of the task, a begin_time field 616B for storing the time when the message is received, and an end_time field 618B for storing when the task is finished. In this example, the state of the task may be modified according to the user's action. For example, when Amanda receives the email notifying her to book a meeting room, the state may be set to "unfinished" indicating that the task is waiting for further processing. Later, when Amanda finishes her development work at hand and has booked the meeting room, the state may be modified to "finished."

Referring back to FIG. 5, in addition to the task reminders as illustrated in FIG. 5, the task reminder may include further detailed information of the task. For example, a floating window indicating details of Tony's email may be provided when the cursor is hovering over the flag 526. In the floating window, the ID, the context information, the state, the begin_time and the end_time may be displayed based on the data structure 600B of FIG. 6B. Additionally and/or alternatively, the content in the task bar 530 may include additional details such as the ID, the context information, the state, the begin_time and the end_time.

The following paragraphs will describe example data structures for storing the task reminders. Table 1 shows an example table including several task reminders that are generated according to the method of the present disclosure.

TABLE 1

Example Data Structure

| ID | Context Information | State | Begin Time | End Time |
|---|---|---|---|---|
| 1 | File:///C:/Users/IBM_ADMIN/Documents/SametimeTranscripts/xxx@cn.ibm.com/20150820/xxx.html#mark1 | finished | 20150820 15:30:21 | 20150820 18:30:00 |
| 2 | Note://D02lmb/xxxxx/yyy#zzz | unfinished | 20150820 15:48:21 | |
| ... | ... | ... | ... | ... |

In Table 1, the respective columns illustrate the respective fields comprised in the data structure 600B of FIG. 6B. Where the first entry in the table is associated with a task description in a message at the address of "File:///C:/Users/IBM_ADMIN/Documents/Sametime Transcripts/xxx@cn.ibm.com/20150820/xxx.html#mark1." This message is received at 15:30:21 on Aug. 20, 2015 and the task associated with the task reminder is finished at 18:30:00 on Aug. 20, 2015. Accordingly, the state of the task is "finished" in Table 1. The second entry in the table is associated to a task description in a message at the address of "Note://D02lmb/xxxxx/yyy#zzz," and the state of the task is "unfinished."

It is appreciated that Table 1 shows an example data structure for storing the task reminders, while another data structure may be adopted in another example. For example, a further column "Application" may be added into the table for indicating the name of the application via which the message is received. For example, Table 2 shows another example data structure, where the second column indicates that the message in the first entry is received via Sametime® and the message in the second entry is received via Note®.

TABLE 2

Example Data Structure

| ID | Application | Context Information | State | Begin Time | End Time |
|---|---|---|---|---|---|
| 1 | Sametime ® | File:///C:/Users/IBM_ADMIN/Documents/SametimeTranscripts/xxx@cn.ibm.com/20150820/xxx.html#mark1 | finished | 20150820 15:30:21 | 20150820 18:30:00 |
| 2 | Note ® | Note://D02lmb/xxxxx/yyy#zzz | unfinished | 20150820 15:48:21 | |
| ... | ... | ... | ... | ... | ... |

It is appreciated that Tables 1 and 2 are only examples and more or fewer columns may be contained in the table. For example, another column, "Note," may be added into the table based on comments from the user. Meanwhile, a further data structure other than a table may be adopted in another embodiment.

In an embodiment of the present disclosure, the user may interact with the computer system and various responses may be provided according to the user's actions. FIG. 7 schematically illustrates a flowchart of a method 700 for processing a user action according to an embodiment of the present disclosure. During operations of the present disclosure, a new task reminder may be created in response to the user dropping a pin in the message, the content of the task reminder may be modified; and the task reminder may be terminated in response to the user having finished the task associated with the task reminder.

As illustrated in FIG. 7, the user action 710 from the user may be classified into one of three types: a creating type, a terminating type and a modifying type. In Step 720, the type of the user action 710 may be determined. For example, if the user receives an email requesting the user to book a meeting room and the user highlights a task description in the email, then this user action may be identified as a creating type. If the user finishes the task associated with the task reminder displayed in the task bar, then the user action may be identified as a terminating type. Further, if the user edits his/her comments in the task reminder, the user action may be identified as a modifying type.

In Step 730, in response to the user action being a creating type, a new entry may be created in the reminder table. Continuing the example of Table 2, if an email asking Amanda to book a meeting room is received at 16:00:00 on Aug. 20, 2015, then a new entry may be added into Table 2. At this point, the updated reminder table may be illustrated as Table 3.

TABLE 3

Example Data Structure

| ID | Application | Context Information | State | Begin Time | End Time |
|---|---|---|---|---|---|
| 1 | Sametime ® | File:///C:/Users/IBM_ADMIN/Documents/SametimeTranscripts/xxx@cn.ibm.com/20150820/xxx.html#mark1 | finished | 20150820 15:30:21 | 20150820 18:30:00 |
| 2 | Note ® | Note://D02lmb/xxxxx/yyy#zzz | unfinished | 20150820 15:48:21 | |
| 3 | Note ® | Note://D02lmb/aaaaa/bbb#ccc | unfinished | 20150820 16:00:00 | |
| ... ... | ... | ... | ... | ... | ... |

In Step 740, in response to the user action being a terminating type, the entry associated with the finished task may be modified or removed from the reminder table. For example, if the user finishes the task associated with the third entry in Table 3 at 19:00:00, then the state of the third entry may be modified to "finished" and the time of "20150820 19:00:00" may be added into the "End Time" field, where the updated table may be illustrated as Table 4. Alternatively, the third entry may be directly removed from Table 3 in another embodiment.

TABLE 4

Example Data Structure

| ID | Application | Context Information | State | Begin Time | End Time |
|---|---|---|---|---|---|
| 1 | Sametime ® | File:///C:/Users/IBM_ADMIN/Documents/SametimeTranscripts/xxx@cn.ibm.com/20150820/xxx.html#mark1 | finished | 20150820 15:30:21 | 20150820 18:30:00 |
| 2 | Note ® | Note://D02lmb/xxxxx/yyy#zzz | unfinished | 20150820 15:48:21 | |
| 3 | Note ® | Note://D02lmb/aaaaa/bbb#ccc | finished | 20150820 16:00:00 | 20150820 19:00:00 |
| ... ... | ... | ... | ... | ... | ... |

In Step 750, in response to the user action being a modifying type, the entry associated with the task may be modified in the reminder table. For example, if the user modifies the comments associated with one task reminder, then the corresponding field in the entry may be modified.

Next, in Step 760, the task reminder may be rendered in the application and/or the task bar based on the reminder table. Specifically, a new task reminder may be rendered in the application and/or the task bar in response to a new entry is newly added into the reminder table; the task reminder associated with a finished task may be removed from the application and/or the task bar in response to the user having finished the task; and the details of the task may be updated in the application and/or the task bar in response to the user modifying the comments on the task.

In an embodiment of the present disclosure, where the message is a voice message, and the task description may be extracted by performing a voice recognition to the voice message. Various technical solutions may be adopted in the voice recognition. Once the voice message is converted into a text message, the text message may be processed according to the method of the present disclosure. For example, a task description may be identified from the voice message, context information may be obtained, and then a task reminder may be generated.

Although the above paragraph illustrates that the voice is received in a message, in another embodiment, the voice may be received in another carrier such as a voice call or a video call. For example, Amanda receives a voice call from Tony and is asked to booking a meeting room. With the method of the present disclosure, the voice call may be automatically analyzed by a voice recognition procedure and then some keywords such as "book," "meeting room," and "fax" may be used in identifying the task description. If it is determined that the voice call includes a request of booking a meeting room, then the address of the request may be recorded for further processing. For example, the start time of a voice segment in the voice call related to booking a meeting room may be identified, and then a task reminder may be generated based on the start time. At this point, if Amanda clicks the generated task reminder in the task bar, the voice segment related to booking a meeting may be played to the user.

In an embodiment of the present disclosure, the entries in the task bar may be sorted according to the types of the application. For example, the task reminders that are generated from messages transmitted via the email client may be displayed in one list, and the task reminders that are generated from messages transmitted via an instant message tool may be displayed in another list. Further, each task reminder may be set with a priority level, and the user may also sort the task reminders according to the state, the begin time, the priority level and another attribute of the task.

Various embodiments implementing the method of the present disclosure have been described above with reference to the accompanying drawings. Those skilled in the art may understand that the method may be implemented in software, hardware or a combination of software and hardware. Moreover, those skilled in the art may understand by implementing steps in the above method in software, hardware or a combination of software and hardware, there may be provided an apparatus/system based on the same disclosure concept. Even if the apparatus/system has the same hardware structure as a general-purpose processing device, the functionality of software contained therein makes the apparatus/system manifest distinguishing properties from the general-purpose processing device, thereby forming an apparatus/system of the various embodiments of the present disclosure. The apparatus/system described in the present disclosure comprises several means or modules, the means or modules configured to execute corresponding steps. Upon reading this specification, those skilled in the art may understand how to write a program for implementing actions performed by these means or modules. Since the apparatus/system is based on the same disclosure concept as the method, the same or corresponding implementation details are also applicable to means or modules corresponding to the method. As detailed and complete description has been presented above, the apparatus/system is not detailed below.

According to an embodiment of the present disclosure, a computing system is proposed. The computing system comprises a computer processor coupled to a computer-readable memory unit, the memory unit comprising instructions that when executed by the computer processor implements a method. In the method, a task description is identified from a message in an application. Then, context information indicating an association between the task description and the application is obtained. Next, a task reminder is generated based on the obtained context information.

In an embodiment of the present disclosure, the generated task reminder may be displayed. In an embodiment of the present disclosure, the generated task reminder may be displayed in the application. In an embodiment of the present disclosure, the generated task reminder may be displayed in a task bar.

In an embodiment of the present disclosure, in response to the task reminder being triggered, a scenario in which the message is received may be reproduced based on the context information.

In an embodiment of the present disclosure, the context information may include at least an address storing the task description from the message in the application, and the task description may be rendered by displaying the message in the application based on the address.

In an embodiment of the present disclosure, the context information may include at least a snapshot of the task description from the message in the application, and the task description may be rendered by displaying the snapshot of task description.

In an embodiment of the present disclosure, in response to a flag being set in the message, the task description may be identified based on a position of the flag in the message.

In an embodiment of the present disclosure, the task description may be identified based on a syntactic analysis of the message.

In an embodiment of the present disclosure, the message may be selected from a group consisting of an email, an instant message, and a real time communication.

According to an embodiment of the present disclosure, a computer program product is proposed. The computer program product is tangibly stored on a non-transient machine-readable medium and comprising machine-executable instructions. The instructions, when executed on an electronic device, cause the electronic device to: identify a task description from a message in an application; obtain context information indicating an association between the task description and the application; and generate a task reminder based on the obtained context information.

In an embodiment of the present disclosure, the instructions may further cause the electronic device to: display the generated task reminder. In an embodiment of the present disclosure, the instructions may further cause the electronic device to: display the generated task reminder in the application. In an embodiment of the present disclosure, the instructions may further cause the electronic device to: display the generated task reminder in a task bar.

In an embodiment of the present disclosure, the instructions may further cause the electronic device to: in response to the task reminder being triggered, reproduce a scenario in which the message is received based on the context information.

In an embodiment of the present disclosure, the context information may include at least an address storing the task description from the message in the application, and the instructions may further cause the electronic device to render the task description by displaying the message in the application based on the address.

In an embodiment of the present disclosure, the context information may include at least a snapshot of the task description from the message in the application, and the instructions may further cause the electronic device to, render the task description by displaying the snapshot of task description.

In an embodiment of the present disclosure, the instructions may further cause the electronic device to identify the task description based on a position of the flag in the message in response to a flag being set in the message.

In an embodiment of the present disclosure, the instructions may further cause the electronic device to identify the task description based on a syntactic analysis of the message.

In an embodiment of the present disclosure, where the message may be selected from a group consisting of an email, an instant message, and a real time communication.

Moreover, the system may be implemented by various manners, including software, hardware, firmware or a random combination thereof. For example, in some embodiments, the apparatus may be implemented by software and/or firmware. Alternatively or additionally, the system may be implemented partially or completely based on hardware. for example, one or more units in the system may be implemented as an integrated circuit (IC) chip, an application-specific integrated circuit (ASIC), a system on chip (SOC), a field programmable gate array (FPGA), etc. The scope of the present intention is not limited to this aspect.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of generating task reminders, comprising:
   parsing digital data from a message received by a message-receiving application over a network interface to generate parsed digital text;
   identifying, using a processor, a task description from the parsed digital text;
   obtaining context information from the parsed digital text identifying the message-receiving application from which the task description originates, wherein the context information is represented as a triple of the association between the task description and the identity of the message-receiving application;

generating automatically, using the processor, a task reminder based on the task description and the context information, the task reminder including digital text identifying a name of the message-receiving application from which the task description originates; and displaying the generated task reminder in a dedicated task bar on a display, where the task reminder is coupled to the original message.

2. The method as recited in claim 1, further comprising: reproducing a scenario in which the message is received based on the context information in response to a task reminder triggering event by displaying the original message.

3. The method as recited in claim 2, wherein the context information includes an address storing the task description from the message in the message-receiving application, and wherein the reproducing the scenario further comprises:

rendering the task description by displaying, on the display, the message in the message-receiving application based on the address.

4. The method as recited in claim 2, wherein the context information includes a snapshot of the task description from the message in the message-receiving application, and wherein the reproducing the scenario further comprises:

rendering the task description by displaying, on the display, the snapshot of the task description.

5. The method as recited in claim 1, wherein the identifying the task description further comprises: identifying the task description based on a position of a flag set in the message.

6. The method as recited in claim 1, wherein the identifying the task description further comprises: identifying the task description based on a syntactic analysis of the message, the task reminder has a data structure including a state field indicating whether the task is finished or unfinished, and the tuple includes a time stamp.

7. A system for generating task reminders, comprising:
a memory; and
a processor coupled to the memory, the processor being configured to:
identify a task description by parsing digital text from a message in a message-receiving application;
obtain context information from the parsed digital text identifying the message-receiving application from which the task description originates, wherein the context information is represented as a triple of the association between the task description and the identity of the message-receiving application;
generate automatically, using the processor, a task reminder based on the task description and the context information, the task reminder including digital text identifying a name of the message-receiving application from which the task description originates; and
display the generated task reminder in a dedicated task bar on a display, where the task reminder is coupled to the original message.

8. The system as recited in claim 7, wherein the processor is further configured to: reproduce a scenario in which the message is received based on the context information in response to a task reminder triggering event by displaying the original message.

9. The system as recited in claim 8, wherein the context information includes an address storing the task description from the message in the message receiving application, and wherein the processor is further configured to:

render the task description by displaying, on the display, the message in the message-receiving application based on the address.

10. The system as recited in claim 7, wherein the context information includes a snapshot of the task description from the message in the message-receiving application, and wherein the processor is further configured to:

render the task description by displaying, on the display, the snapshot of task description.

11. The system as recited in claim 7, wherein the processor is further configured to: identify the task description based on a position of a flag set in the message.

12. The system as recited in claim 7, wherein the processor is further configured to: identify the task description based on a syntactic analysis of the message, the task reminder has a data structure including a state field indicating whether the task is finished or unfinished, and the tuple includes a time stamp.

13. A non-transitory computer readable storage medium comprising a computer readable program for generating task reminders, wherein the computer readable program when executed on a computer causes the computer to perform the steps of:

identifying, using a processor, a task description by parsing digital text from a message in a message-receiving application;

obtaining context information from the parsed digital text identifying the message-receiving application from which the task description originates, wherein the context information is represented as a topic of the association between the task description and the identity of the message-receiving application;

generating automatically, using the processor, a task reminder based on the task description and the context information, the task reminder including digital text identifying a name of the message-receiving application from which the task description originates; and displaying the generated task reminder in a dedicated task bar on a display, where the task reminder is coupled to the original message.

14. The non-transitory computer readable storage medium as recited in claim 13, wherein the computer readable program whet executed on the computer causes the computer to further perform the step of:

reproducing a scenario in which the message is received based on the context information in response to the task reminder being triggered by displaying the original message.

15. The non-transitory computer readable storage medium as recited in claim 14, wherein the context information includes an address storing the task description from the message in the application, and wherein the computer readable program when executed on the computer causes the computer to further perform the step of:

rendering the task description by displaying, on the display, the message in the message-receiving application based on the address.

16. The non-transitory computer readable storage medium as recited in claim 13, wherein the context information includes a snapshot of the task description from the message in the message-receiving application, and wherein the computer readable program when executed on the computer causes the computer to further perform the step of:

rendering the task description by displaying, on the display, the snapshot of the task description.

17. The non-transitory computer readable storage medium as recited in claim 13, wherein the computer readable program when executed on the computer causes the computer to further perform the step of:
   identifying the task description based on a position of a flag set in the message.

\* \* \* \* \*